US012612523B2

(12) United States Patent
Jing et al.

(10) Patent No.: US 12,612,523 B2
(45) Date of Patent: Apr. 28, 2026

(54) FIREPROOF COATING MATERIAL

(71) Applicant: WEIFANG JIA CHENG DIGITAL MATERIALS CO., LTD., Shandong (CN)

(72) Inventors: Baihua Jing, Shandong (CN); Yunshu Du, Shandong (CN); Bingxin Wang, Shandong (CN); Minqing Wang, Shandong (CN); Faxin Qiu, Shandong (CN); Tianfeng Ma, Shandong (CN); Hailiang Li, Shandong (CN)

(73) Assignee: WEIFANG JIA CHENG DIGITAL MATERIALS CO., LTD., Weifang (CN)

( * ) Notice: Subject to any disclaimer, the term of this patent is extended or adjusted under 35 U.S.C. 154(b) by 484 days.

(21) Appl. No.: 18/035,757

(22) PCT Filed: Nov. 14, 2022

(86) PCT No.: PCT/CN2022/131684

§ 371 (c)(1),
(2) Date: May 8, 2023

(87) PCT Pub. No.: WO2024/021366

PCT Pub. Date: Feb. 1, 2024

(65) Prior Publication Data

US 2024/0343921 A1 Oct. 17, 2024

(30) Foreign Application Priority Data

Jul. 25, 2022 (CN) ........................ 202210880106.X

(51) Int. Cl.
*C09D 5/18* (2006.01)
*C09D 7/45* (2018.01)
(Continued)

(52) U.S. Cl.
CPC ................. *C09D 5/18* (2013.01); *C09D 7/45* (2018.01); *C09D 7/63* (2018.01); *C09D 175/04* (2013.01); *C08K 5/50* (2013.01)

(58) Field of Classification Search
CPC ... C09D 5/18; C09D 7/45; C09D 7/63; C09D 175/04; C08K 5/50
See application file for complete search history.

(56) References Cited

U.S. PATENT DOCUMENTS 4,110,415 A 8/1978 Boros et al.
4,855,507 A 8/1989 Robertson et al.

FOREIGN PATENT DOCUMENTS

CN 1487946 A 4/2004
CN 103073938 A 5/2013
(Continued)

*Primary Examiner* — Robert S Walters, Jr.

(57) ABSTRACT

The present application discloses a fireproof coating material, and belongs to the technical field of fireproof coatings. The fireproof coating material includes 40-80 parts of an aqueous curing agent, 20-50 parts of water and 80-200 parts of a mother liquor of the fireproof coating material, wherein the mother liquor of the fireproof coating material consists of 50-80 parts of a flame retardant, 15-25 parts of a dispersant and 190-220 parts of water. The flame retardant used can not only effectively improve the problems of poor compatibility and mixing uniformity of a flame retardant with an aqueous latex in the existing fireproof coating material, but also can utilize O and H contained in a flame retardant system to form a carbonized layer during dehydration to isolate oxygen, preventing combustion, and enhancing the fire retardant performance.

14 Claims, 1 Drawing Sheet

(51) Int. Cl.

| | |
|---|---|
| ***C09D 7/63*** | (2018.01) |
| ***C09D 175/04*** | (2006.01) |
| *C08K 5/50* | (2006.01) |

(56) References Cited

FOREIGN PATENT DOCUMENTS

| | | | |
|---|---|---|---|
| CN | 106833081 | A | 6/2017 |
| CN | 108587340 | A | 9/2018 |
| CN | 111732885 | A | 10/2020 |
| CN | 115074012 | A | 9/2022 |
| EP | 4011891 | A1 | 6/2022 |
| WO | 2015153094 | A1 | 10/2015 |

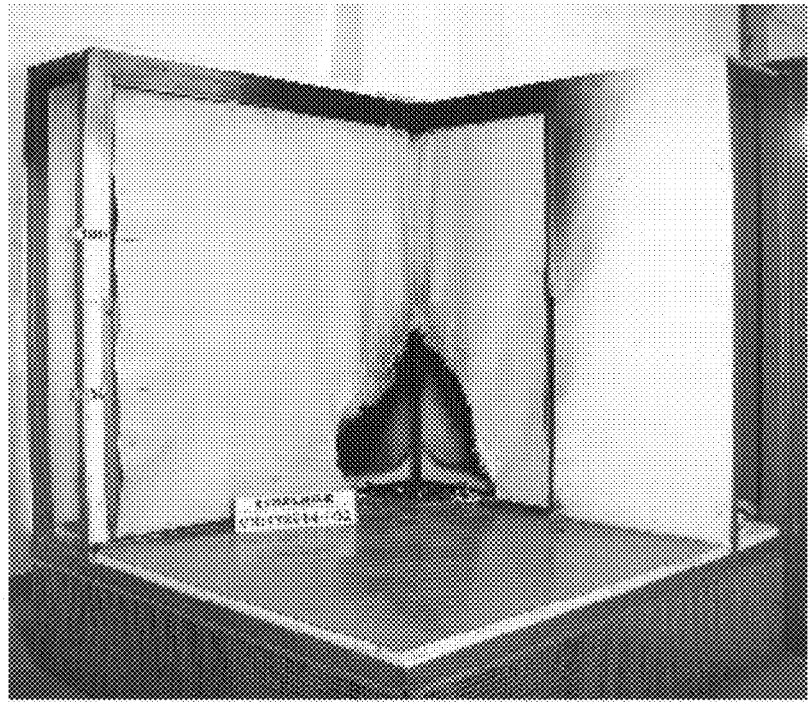

FIREPROOF COATING MATERIAL

This application claims priority to Chinese patent application No. 202210880106. X, filed with the Chinese Patent Office on Jul. 25, 2022 and entitled "FIREPROOF COATING MATERIAL", the entire contents of which are incorporated herein by reference.

FIELD OF INVENTION

The present application relates to a fireproof coating material, and belongs to the technical field of fireproof coatings.

DESCRIPTION OF RELATED ART

Organophosphorus flame retardants have become the research hotspot of environment-friendly flame retardants in recent years because of their good flame retardancy, and low corrosivity and toxicity of their decomposition products of combustion and thermal cracking and combustion products of their flame retardant polymers. In organophosphorus compounds, since the bond energy of a C—P bond is smaller than that of a C—C bond, the C—P bond breaks first during heating, thereby leading to a decrease in the thermal decomposition temperature, in accordance with the flame retardant principle of phosphorus-based flame retardants, after C—P breakage, a P-containing moiety and oxygen easily generate phosphoric acid, phosphoric acid generates metaphosphoric acid at high temperature, and heat is absorbed during dehydration. In addition, metaphosphoric acid covers the surface of the burning polymer in a glass film to isolate oxygen, preventing combustion, while also capturing O and H from the polymer, facilitating dehydration of the polymer to form a carbonized layer, thereby preventing or reducing the production of combustible gas and reducing the thermal decomposition rate of the polymer.

A fireproof coating material is a special coating used on the surface of a flammable substrate that can reduce the flammability of the surface of the coated material, retard the rapid propagation of fire, and increase the fire resistance limit of the coated material. A traditional fireproof coating is prepared by mixing a flame retardant with a latex by physical blending, currently aqueous latexes have attracted extensive attention because their low VOC emissions reduce pollution to the atmosphere, but the compatibility and mixing uniformity of the aqueous latexes with flame retardants directly affect the flame retardant performance, and relatively environment-friendly organophosphorus flame retardants require that the system contains a large amount of H and O elements to form a carbonized layer after dehydration, and thus applications are somewhat limited. Therefore, fireproof coatings prepared from current flame retardants are difficult to meet people's needs, and it is urgent to develop a new fireproof coating material.

SUMMARY OF THE INVENTION

In order to solve the above problems, provided is a fireproof coating material. The flame retardant can not only effectively improve the problems of poor compatibility and mixing uniformity of a flame retardant with an aqueous latex in the existing fireproof coating material, but also can utilize O and H contained in a flame retardant system to form a carbonized layer during dehydration to isolate oxygen, preventing combustion, and enhancing the fire retardant performance.

According to one aspect of the present application, provided is a fireproof coating material, including, in parts by weight, 40-80 parts of an aqueous curing agent, 20-50 parts of water and 80-200 parts of a mother liquor of the fireproof coating material, wherein the mother liquor of the fireproof coating material consists of 50-80 parts of a flame retardant, 15-25 parts of a dispersant and 190-220 parts of water, and the flame retardant has a molecular structural formula represented by a formula I and/or a formula II:

Formula I

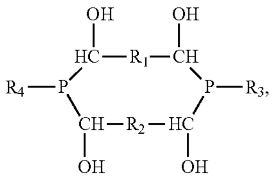

Formula II

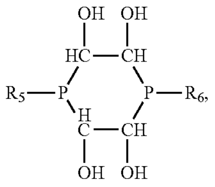

wherein each of $R_1$ and $R_2$ is any one independently selected from a group consisting of substituted or unsubstituted C1-C6 alkyl, C3-C5 cycloalkyl, and substituted or unsubstituted phenyl, each of $R_3$ and $R_4$ is any one independently selected from a group consisting of substituted or unsubstituted C1-C8 alkyl, C5-C7 cycloalkyl, and substituted or unsubstituted phenyl, and each of $R_5$ and $R_6$ is any one independently selected from a group consisting of substituted or unsubstituted C1-C8 alkyl, C5-C7 cycloalkyl, and substituted or unsubstituted phenyl.

The flame retardant is of a cyclic structure and stable in structure, which can improve its heat resistance, a C—P bond contained in the flame retardant can absorb heat and play a flame retardant effect, four hydroxyl contained in the flame retardant have good water solubility, and when the flame retardant is mixed with an aqueous latex, the compatibility and mixing uniformity of the flame retardant with the latex can be improved by hydrogen bonding, thus enabling uniform dispersion in the fireproof coating material, preventing agglomeration, and increasing the compactness of the fireproof coating material itself; and at the same time, the hydroxyl can provide H and O elements for a dehydrating carbonization step in a flame retardant mechanism, thereby forming a carbonized layer to isolate oxygen, preventing the propagation of fire and further enhancing the flame retardant capability.

Optionally, the flame retardant is selected from a mixture of the formula I and the formula IL, and a weight ratio of the flame retardant of the formula I to the flame retardant of the formula II is (5-7):1.

The flame retardant includes both the structure of the formula I and the structure of the formula II, and the reason is that compared with the structure of the formula I, the structure of the formula II is a small cyclic structure, and can be filled in gaps of the structure of the formula I, thereby reducing the porosity of the fireproof coating material after coating, enabling all the flame retardants to be adsorbed on a substrate, and preventing delamination and cracking of the fireproof coating material to play a protective and flame retardant effect on the substrate. The above weight ratio can improve the compatibility of the flame retardant with the fireproof coating and reduce the risk of delamination and cracking of the fireproof coating material while guaranteeing the flame retardant effect of the flame retardant.

Optionally, each of the $R_1$ and the $R_2$ is any one independently selected from a group consisting of substituted or unsubstituted C1-C4 alkyl, and C3-C5 cycloalkyl, each of $R_3$ and $R_4$ is any one independently selected from a group consisting of substituted or unsubstituted C4-C7 alkyl, and C5-C7 cycloalkyl, and each of $R_5$ and $R_6$ is any one independently selected from a group consisting of substituted or unsubstituted C4-C7 alkyl, and C5-C7 cycloalkyl.

Optionally, the $R_1$ and the $R_2$ are respectively and independently selected from hydroxyl-substituted C1-C4 alkyl, $R_3$ and $R_4$ are respectively and independently selected from unsubstituted C4 alkyl or C6 cycloalkyl, and $R_5$ and $R_6$ are respectively and independently selected from unsubstituted C4 alkyl or C6 cycloalkyl.

$R_1$ and $R_2$ use hydroxyl-substituted alkyl, which can further increase the content of hydroxyl in the flame retardant, and further increase the dispersion uniformity of the flame retardant in the aqueous latex, as well as the flame retardant properties of the fireproof coating material itself, and the flame retardant properties are increased by at least 10% when hydroxyl-substituted C1-C4 alkyl is used compared with unsubstituted C1-C4 alkyl.

Optionally, the flame retardant is prepared by a method including the steps of:

weighing a first monomer, dissolving the first monomer in a solvent, adding a second monomer, stirring at 20-40° C. for 4 h, filtering, washing and drying to obtain the flame retardant, wherein a molar ratio of the first monomer to the second monomer is 1:(0.9-1.1);

the first monomer is selected from at least one of t-butylphosphine, isobutyl phosphine, monoisooctyl phosphine, cyclohexylphosphine, and phenylphosphine; and the second monomer is selected from at least one of glyoxal, malondialdehyde, butanedial, hydroxypropanedial, hydroxy-1,4-butanedial, 2-hydroxyhexanedial, 2-cyclopropylmalondialdehyde, 3-methylglutaraldehyde, 2-methylglutaraldehyde, 2-phenylmalondialdehyde, cyclohexane-1,4-dicarbaldehyde, 2-bromomalonaldehyde, and 2-chloromalonaldehyde.

The second monomer is selected in a slight excess to facilitate the formation of the cyclic structure of the flame retardant, and if the amount of the second monomer exceeds the above range, the formation of a cyclic flame retardant will be hindered, and the obtained flame retardant contains a linear compound and a large number of impurities.

Optionally, the molar ratio of the first monomer to the second monomer is 1:(1-1.05).

Optionally, the first monomer is selected from at least one of t-butylphosphine, isobutyl phosphine, and cyclohexylphosphine; and the second monomer is selected from at least one of glyoxal, malondialdehydel, butanedial, hydroxypropanedial, hydroxy-1,4-butanedial, and 2-hydroxyhexanedial.

Optionally, the solvent is selected from any one or more of water, methanol, ethanol, isopropanol, dichloromethane, trichloromethane, tetrahydrofuran, benzene, toluene, xylene, diethyl ether, and ethylene oxide.

Optionally, the fireproof coating material includes, in parts by weight, 60-80 parts of the aqueous curing agent, 30-50 parts of the water and 150-200 parts of the mother liquor of the fireproof coating material, wherein the mother liquor of the fireproof coating material consists of 60-70 parts of the flame retardant, 20-25 parts of the dispersant and 200-210 parts of the water.

Optionally, preparation of the fireproof coating material includes the steps of:

(1) adding the flame retardant and the dispersant to water, conducting uniform stirring to obtain a mixed liquid, milling the mixed liquid in a ball mill for at least 50 h, and filtering to obtain the mother liquor of the fireproof coating material; and (2) uniformly mixing the aqueous curing agent with water, adding the mother liquor of the fireproof coating material, and performing mixing to obtain the fireproof coating material.

Optionally, the aqueous curing agent is selected from at least one of polyurethane, polyacrylate, polymethacrylate, styrene-butadiene copolymer, polyvinyl alcohol, polystyrene, and polyvinyl acetate.

Optionally, the dispersant is selected from at least one of sodium naphthalene sulfonate, sodium dioctyl sulfosuccinate, and alcohol alkoxylate.

The beneficial effects of the present application include, but are not limited to:

1. according to the fireproof coating material of the present application, the aqueous curing agent is well compatible with the flame retardant, the flame retardant can be uniformly dispersed in water and the aqueous curing agent to achieve uniformity of fire resistance, and at the same time, the flame retardant can be stably adsorbed at a surface layer of the substrate to improve the compactness of the fireproof coating material.

2. According to the fireproof coating material of the present application, when the fireproof coating material is prevented from burning, a P element in the flame retardant forms a protective film and captures H and O elements from the flame retardant or the aqueous curing agent, facilitating dehydration of the polymer to form a carbonized layer, so that the surface of the fireproof coating is isolated from oxygen, achieving the purpose of flame retardancy.

3. According to the fireproof coating material of the present application, among cyclic phosphorus-based flame retardants with close phosphorus content, the flame retardant in the present application has higher water solubility, while others are insoluble in water, so the flame retardant can have better compatibility with the aqueous curing agent, the process of preparing the fireproof coating is more convenient and fast, and the fireproof coating material is more stable during use.

BRIEF DESCRIPTION OF DRAWINGS

The drawings set forth herein are provided to provide a further understanding of the present application and constitute a part of the present application, and illustrative embodiments of the present application and descriptions thereof are provided to explain the present application and do not constitute undue limitations of the present application. In the drawings:

FIG. 1 is a process diagram of a flame retardancy test of a fireproof coating material 5# according to an embodiment of the present application according to the EN 13823 standard.

DETAILED DESCRIPTION OF THE PREFERRED EMBODIMENTS

The present application is described in detail below with reference to embodiments, but the present application is not limited to these embodiments.

Raw materials in the embodiments of the present application were purchased commercially unless otherwise specified.

Embodiment 1 Synthesis of Flame Retardant

Flame Retardant 1#

Isobutyl phosphine was weighed and dissolved in tetrahydrofuran, an aqueous glyoxal solution was added, stirring was conducted at 25° C. for 4 h, and the stirred material was filtered, washed and dried to obtain a flame retardant 1#, wherein a molar ratio of isobutyl phosphine to glyoxal was 1:1.05, and a structural formula of the flame retardant 1# is the structure of the formula I.

Flame Retardant 2#

Cyclohexylphosphine was weighed and dissolved in dichloromethane, an aqueous glyoxal solution was added, stirring was conducted at 25° C. for 4 h, the stirred material was filtered, washed and dried to obtain a flame retardant 2#, wherein a molar ratio of cyclohexylphosphine to glyoxal was 1:1.1, and a structural formula of the flame retardant 2# is the structure of the formula I.

Flame Retardant 3#

Isobutyl phosphine was weighed and dissolved in tetrahydrofuran, an aqueous butanedial solution was added, stirring was conducted at 25° C. for 4 h, and the stirred material was filtered, washed and dried to obtain a flame retardant 3#, wherein a molar ratio of isobutyl phosphine to butanedial was 1:1.05, and a structural formula of the flame retardant 3# is the structure of the formula II.

Flame Retardant 4#

Phenylphosphine was weighed and dissolved in tetrahydrofuran, an aqueous butanedial solution was added, stirring was conducted at 25° C. for 4 h, and the stirred material was filtered, washed and dried to obtain a flame retardant 4#, wherein a molar ratio of phenylphosphine to butanedial was 1:0.9, and a structural formula of the flame retardant 4# is the structure of the formula II.

Flame Retardant 5#

Isobutyl phosphine was weighed and dissolved in tetrahydrofuran, an aqueous hydroxypropanedial solution was added, stirring was conducted at 25° C. for 4 h, and the stirred material was filtered, washed and dried to obtain a flame retardant 5#, wherein a molar ratio of isobutyl phosphine to hydroxypropanedial was 1:1.05, and a structural formula of the flame retardant 5# is the structure of the formula II.

Flame Retardant 6#

Isobutyl phosphine was weighed and dissolved in tetrahydrofuran, a solution of cyclohexane-1,4-dicarbaldehyde in trichloromethane was added, stirring was conducted at 25° C. for 4 h, and the stirred material was filtered, washed and dried to obtain a flame retardant 6#, wherein a molar ratio of isobutyl phosphine to cyclohexane-1,4-dicarbaldehyde was 1:1.05, and a structural formula of the flame retardant 6# is the structure of the formula II.

Embodiment 2 Fireproof Coating Material

Fireproof Coating Material 1#

(1) 70 parts of the flame retardant 2# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 1#.

Fireproof Coating Material 2#

(1) 70 parts of the flame retardant 6# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material, and (2) 80 parts of a polyurethane aqueous curing agent and 50 parts of water were uniformly mixed, then 150 parts of the above mother liquor of the fireproof coating material was added, and mixing was performed to obtain a fireproof coating material 2#.

Fireproof Coating Material 3#

(1) 58.33 parts of the flame retardant 3#, 11.67 parts of the flame retardant 1# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 3#.

Fireproof Coating Material 4#

(1) 61.25 parts of the flame retardant 4#, 8.75 parts of the flame retardant 1# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 4#.

Fireproof Coating Material 5#

(1) 60 parts of the flame retardant 5#, 10 parts of the flame retardant 1# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 5#.

Fireproof Coating Material 6#

(1) 10 parts of the flame retardant 4#, 60 parts of the flame retardant 1# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 6#.

Fireproof Coating Material 7#

(1) 60 parts of the flame retardant 6#, 10 parts of the flame retardant 1# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 7#.

Fireproof Coating Material 8#

(1) 60 parts of the flame retardant 6#, 10 parts of the flame retardant 2# and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a fireproof coating material 8#.

Fireproof Coating Material 9#

(1) 60 parts of the flame retardant 5#, 10 parts of the flame retardant 1# and 15 parts of a dispersant were added to 190 parts of water, uniform stirring was conducted to obtain a mixed liquid, the mixed liquid was then milled in a ball mill for 50 h, and the milled material was filtered to obtain a mother liquor of a fireproof coating material; and (2) 40 parts of a polyurethane aqueous curing agent and 20 parts of water were uniformly mixed, 80 parts of the above mother liquor of the fireproof coating material was added, and mixing was performed to obtain a fireproof coating material 9#.

Fireproof Coating Material 10#

(1) 60 parts of the flame retardant 5#, 10 parts of the flame retardant 1# and 25 parts of a dispersant were added to 210 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 200 parts of the above mother liquor of the fireproof coating material was added, and mixing was performed to obtain a fireproof coating material 10#.

Comparative Fireproof Coating Material D1#

(1) 70 parts of a flame retardant 5060 from Sandoflam and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a comparative fireproof coating material D1#.

Comparative Fireproof Coating Material D2#

(1) 70 parts of a flame retardant TM-02 from Tianyun and 20 parts of a dispersant were added to 200 parts of water, uniform stirring was conducted to obtain a mixed liquid, the mixed liquid was then milled in a ball mill for 50 h, and the milled material was filtered to obtain a mother liquor of a fireproof coating material; and (2) 80 parts of a polyurethane aqueous curing agent and 50 parts of water were uniformly mixed, then 150 parts of the above mother liquor of the fireproof coating material was added, and mixing was performed to obtain a comparative fireproof coating material D2#.

Test Example 1: Water Solubility Test

A water solubility test was performed using the flame retardant 5060 from Sandoflam and the flame retardants 1# to 6#described above, 10 parts of a flame retardant was added to 100 parts of water at 25° C., and the dissolution properties of the flame retardant were observed after stirring for 10 min, and the test results are shown in Table 1:

TABLE 1

Phosphorus content and water solubility test results

| Sample | Solubility S (g/100 g water) | Water solubility | Phosphorus content (%) |
|---|---|---|---|
| Flame retardant 1# | 5.98 | Soluble | 20.95 |
| Flame retardant 2# | 5.48 | Soluble | 15.05 |
| Flame retardant 3# | 5.39 | Soluble | 17.61 |
| Flame retardant 4# | 5.31 | Soluble | 15.81 |
| Flame retardant 5# | 5.76 | Soluble | 15.66 |
| Flame retardant 6# | 5.24 | Soluble | 13.48 |
| Commercial flame retardant 5060 | 0.008 | Insoluble | 17.89 |

As can be seen from Table 1, among cyclic phosphorus-based flame retardants with close phosphorus content, the flame retardants selected in the present invention have high water solubility, whereas the existing cyclic phosphorus-based flame retardant available on the market is insoluble in water. The reason is that the flame retardant of the present application contains four hydroxyl and can be well bonded to water through hydrogen bonding to be dispersed evenly, and therefore, the flame retardant of the present application can have better compatibility with the aqueous curing agent, and the prepared fireproof coating material is more uniform and stable during use.

Test Example 2: Flame Retardancy Test

Chemical fiber cloth of 130 gsm was coated with the above fireproof coating materials 1# to 10# and the comparative fireproof coating materials D1# to D2# by using 45 wires of a KTQ-200 adjustable film applicator, the flame retardant properties were examined according to test parameters of DIN EN 13501-1, a test standard for building materials and construction commonly used in Europe, the EN ISO 11925-2 standard in which a sample specification was 25 cm*25 cm, and the EN 13823 standard in which a sample specification was 1.5 m*1.5 m, and specific results refer to Table 2:

TABLE 2

| | Test method | | | | | | |
|---|---|---|---|---|---|---|---|
| | | | | | EN 13823 | | |
| | EN ISO 11925-2 (surface test) | | EN ISO 11925-2 (edge test) | | Flame | Heat release | Transverse flame |
| Sample | Damaged length (cm) | Drip afterflame (s) | Damaged length (cm) | Drip afterflame (s) | spread index (W/S) | within 600 s (MJ) | spread length (cm) |
| fireproof coating material 1# | 9.2 | 0.5 | 9.8 | 1.5 | 15 | 0.66 | 44 |
| fireproof coating material 2# | 9 | 0.5 | 9.5 | 1.5 | 14 | 0.64 | 43 |
| fireproof coating material 3# | 8.5 | 0.5 | 9 | 1.5 | 13 | 0.62 | 42 |
| fireproof coating material 4# | 6 | 0.5 | 7.5 | 1.5 | 10 | 0.58 | 38 |
| fireproof coating material 5# | 4.5 | 0 | 6 | 0 | 4 | 0.5 | 32 |
| fireproof coating material 6# | 9.5 | 0.5 | 9.5 | 1.5 | 16 | 0.67 | 45 |
| fireproof coating material 7# | 5.8 | 0.5 | 7.2 | 1.5 | 9 | 1.2 | 38 |
| fireproof coating material 8# | 7 | 1 | 8 | 1.5 | 12 | 0.57 | 38 |
| fireproof coating material 9# | 5.5 | 0.5 | 7 | 1 | 7 | 0.55 | 38 |
| fireproof coating material 10# | 5 | 0.5 | 7 | 1 | 6 | 0.52 | 35 |
| Comparative fireproof coating material D1# | 12.5 | 1.5 | 13.5 | 2 | 38 | 0.90 | 55 |
| Comparative fireproof coating material D2# | 12.2 | 1 | 13.1 | 0 | 40 | 0.89 | 54 |

It can be seen from Table 2 and FIG. 1 that the fireproof coating material prepared in the present application has significantly better properties in preventing combustion than other organophosphorus-based heterocyclic compound materials, with short damaged length, short drip afterflame time, small flame spread index, and low heat release, indicating that the fireproof coating material is uniformly covered by the carbonized layer after dehydration, has good oxygen insulation and heat insulation properties, and can prevent further pyrolysis of the polymer and the pyrolysis products entering a gas phase to participate in combustion, and thus the fireproof coating material of the present application is uniform and stable and has good flame retardancy.

The above are only the embodiments of the present application, and the protection scope of the present application is not limited by these specific embodiments, but is determined by the claims of the present application. For those skilled in the art, various modifications and changes can be made in the present application. Any modifications, equivalent replacements, improvements, and the like, made within the technical idea and principle of the present application should be included within the scope of protection of the present application.

The invention claimed is:

1. A fireproof coating material, comprising, in parts by weight, 40-80 parts of an aqueous curing agent, 20-50 parts of water and 80-200 parts of a mother liquor of the fireproof coating material, wherein the mother liquor of the fireproof coating material consists of 50-80 parts of a flame retardant, 15-25 parts of a dispersant and 190-220 parts of water, and the flame retardant has a molecular structural formula represented by a formula I and/or a formula II:

Formula I

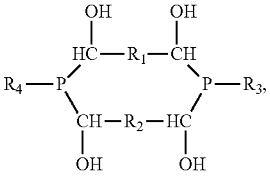

Formula II

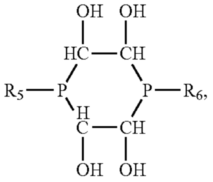

wherein each of $R_1$ and $R_2$ is any one independently selected from a group consisting of substituted or unsubstituted divalent $C_1$-$C_6$ alkyl, divalent $C_3$-$C_5$ cycloalkyl, and substituted or unsubstituted divalent phenyl, each of $R_3$ and $R_4$ is any one independently selected from a group consisting of substituted or unsubstituted $C_1$-$C_8$ alkyl, $C_5$-$C_7$ cycloalkyl, and substituted or unsubstituted phenyl, and each of $R_5$ and $R_6$ is any one independently selected from a group consisting of substituted or unsubstituted $C_1$-$C_8$ alkyl, $C_5$-$C_7$ cycloalkyl, and substituted or unsubstituted phenyl.

2. The fireproof coating material according to claim 1, characterized in that, each of the $R_1$ and the $R_2$ is any one independently selected from a group consisting of substituted or unsubstituted divalent $C_1$-$C_4$ alkyl, and divalent $C_3$-$C_5$ cycloalkyl, each of $R_3$ and $R_4$ is any one independently selected from a group consisting of substituted or unsubstituted $C_4$-$C_7$ alkyl, and $C_5$-$C_7$ cycloalkyl, and each of $R_5$ and $R_6$ is any one independently selected from a group consisting of substituted or unsubstituted $C_4$-$C_7$ alkyl, and $C_5$-$C_7$ cycloalkyl.

3. The fireproof coating material according to claim 2, characterized in that, the $R_1$ and the $R_2$ are respectively and independently selected from hydroxy-substituted divalent $C_1$-$C_4$ alkyl, $R_3$ and $R_4$ are respectively and independently selected from unsubstituted $C_4$ alkyl or $C_6$ cycloalkyl, and $R_5$ and $R_6$ are respectively and independently selected from unsubstituted $C_4$ alkyl or $C_6$ cycloalkyl.

4. The fireproof coating material according to claim 3, characterized in that, the flame retardant is prepared by a method comprising the steps of:

weighing a first monomer, dissolving the first monomer in a solvent, adding a second monomer, stirring at 20-40° C. for 4 h, filtering, washing and drying to obtain the flame retardant, wherein a molar ratio of the first monomer to the second monomer is 1:(0.9-1.1);

the first monomer is selected from at least one of t-butylphosphine, isobutyl phosphine, monoisooctyl phosphine, cyclohexylphosphine, and phenylphosphine; and the second monomer is selected from at least one of glyoxal, malondialdehyde, butanedial, hydroxypropanedial, hydroxy-1,4-butanedial, 2-hydroxyhexanedial, 2-cyclopropylmalondialdehyde, 3-methylglutaraldehyde, 2-methylglutaraldehyde, 2-phenylmalondialdehyde, cyclohexane-1,4-dicarbaldehyde, 2-bromomalonaldehyde, and 2-chloromalonaldehyde.

5. The fireproof coating material according to claim 3 comprising, in parts by weight, 60-80 parts of the aqueous curing agent, 30-50 parts of the water and 150-200 parts of the mother liquor of the fireproof coating material, wherein the mother liquor of the fireproof coating material consists of 60-70 parts of the flame retardant, 20-25 parts of the dispersant, and 200-210 parts of the water.

6. The fireproof coating material according to claim 2, characterized in that, the flame retardant is prepared by a method comprising the steps of:

weighing a first monomer, dissolving the first monomer in a solvent, adding a second monomer, stirring at 20-40° C. for 4 h, filtering, washing and drying to obtain the flame retardant, wherein a molar ratio of the first monomer to the second monomer is 1:(0.9-1.1);

the first monomer is selected from at least one of t-butylphosphine, isobutyl phosphine, monoisooctyl phosphine, cyclohexylphosphine, and phenylphosphine; and the second monomer is selected from at least one of glyoxal, malondialdehyde, butanedial, hydroxypropanedial, hydroxy-1,4-butanedial, 2-hydroxyhexanedial, 2-cyclopropylmalondialdehyde, 3-methylglutaraldehyde, 2-methylglutaraldehyde, 2-phenylmalondialdehyde, cyclohexane-1,4-dicarbaldehyde, 2-bromomalonaldehyde, and 2-chloromalonaldehyde.

7. The fireproof coating material according to claim 2 comprising, in parts by weight, 60-80 parts of the aqueous curing agent, 30-50 parts of the water and 150-200 parts of the mother liquor of the fireproof coating material, wherein the mother liquor of the fireproof coating material consists of 60-70 parts of the flame retardant, 20-25 parts of the dispersant, and 200-210 parts of the water.

8. The fireproof coating material according to claim 1, characterized in that, the flame retardant is prepared by a method comprising the steps of:

weighing a first monomer, dissolving the first monomer in a solvent, adding a second monomer, stirring at 20-40° C. for 4 h, filtering, washing and drying to obtain the flame retardant, wherein a molar ratio of the first monomer to the second monomer is 1:(0.9-1.1);

the first monomer is selected from at least one of t-butylphosphine, isobutyl phosphine, monoisooctyl phosphine, cyclohexylphosphine, and phenylphosphine; and the second monomer is selected from at least one of glyoxal, malondialdehyde, butanedial, hydroxypropanedial, hydroxy-1,4-butanedial, 2-hydroxyhexanedial, 2-cyclopropylmalondialdehyde, 3-methylglutaraldehyde, 2-methylglutaraldehyde, 2-phenylmalondialdehyde, cyclohexane-1,4-dicarbaldehyde, 2-bromomalonaldehyde, and 2-chloromalonaldehyde.

9. The fireproof coating material according to claim 8, characterized in that, the molar ratio of the first monomer to the second monomer is 1:(1-1.05).

10. The fireproof coating material according to claim 8, characterized in that, the first monomer is selected from at least one of t-butylphosphine, isobutyl phosphine, and cyclohexylphosphine; and the second monomer is selected from at least one of glyoxal, malondialdehydel, butanedial, hydroxypropanedial, hydroxy-1,4-butanedial, and 2-hydroxyhexanedial.

11. The fireproof coating material according to claim 1, comprising, in parts by weight, 60-80 parts of the aqueous curing agent, 30-50 parts of the water and 150-200 parts of the mother liquor of the fireproof coating material, wherein the mother liquor of the fireproof coating material consists of 60-70 parts of the flame retardant, 20-25 parts of the dispersant, and 200-210 parts of the water.

12. The fireproof coating material according to claim 1, characterized in that, preparation of the fireproof coating material comprises the steps of:

(1) adding the flame retardant and the dispersant to water, conducting uniform stirring to obtain a mixed liquid, milling the mixed liquid in a ball mill for at least 50 h, and filtering to obtain the mother liquor of the fireproof coating material; and (2) uniformly mixing the aqueous curing agent with water, adding the mother liquor of the fireproof coating material, and performing mixing to obtain the fireproof coating material.

13. The fireproof coating material according to claim 12, characterized in that, the aqueous curing agent is selected from at least one of polyurethane, polyacrylate, polymethacrylate, styrene-butadiene copolymer, polyvinyl alcohol, polystyrene, and polyvinyl acetate.

14. The fireproof coating material according to claim 12, characterized in that, the dispersant is selected from at least one of sodium naphthalene sulfonate, sodium dioctyl sulfosuccinate, and alcohol alkoxylate.

* * * * *